United States Patent Office 3,106,531
Patented Oct. 8, 1963

3,106,531
PROCESS OF ACIDIZING OIL-BEARING STRATA AND COMPOSITION THEREFOR
Carl Cooper, Whittier, Calif., assignor to Petrolite Corporation, Wilmington, Del., a corporation of Delaware
No Drawing. Filed May 8, 1958, Ser. No. 733,846
4 Claims. (Cl. 252—8.55)

This invention relates to the art or procedure commonly referred to as acidization of oil-bearing strata, and which comprises introducing an acid into an oil well for the purpose of causing the acid to distintegrate, dissolve, or react with the oil-bearing structure of the well, in a manner that results in an increase in the amount of crude petroleum obtained from the oil-bearing strata.

More particularly, this invention relates to a composition useful as an emulsion-preventing agent, and also as a corrosion-inhibiting agent, and as a surfactant in the acidization of oil-bearing strata which comprises an acid solution of a cyclic amidine and an acylated aminoalcohol; and to the use of said composition in the acidization of oil-bearing strata.

Many oil wells, after being subjected to acidization, produce emulsions, frequently of a very refractory nature, that have to be demulsified or subjected to chemical, electrical, or similar treatment, in order to recover the oil or valuable constituent of the emulsion. My invention prevents the formation of objectionable water-in-oil type emulsions resulting from acidization of oil wells; or stated in another way, it provides a process or procedure by which the oil-bearing structure of a well can be acidized to increase well productivity, without danger of the procedure causing a refractory petroleum-acid emulsion which will plug the pores of the formation or cause the well to produce a product, which, after being discharged from the well, has to be treated with a demulsifying agent, or subjected to other treatment of the kind commonly employed for converting refractory petroleum emulsions into oil that can be sold to pipe lines and refineries.

Furthermore, in acidizing a well it is conventional practice to add three reagents to the acidizing medium, namely a demulsifier, a corrosion preventive and a surfactant.

I have now discovered that the composition of this invention not only possesses superior demulsification properties but also possesses anti-corrosive as well as surfactant properties. The anti-corrosive and surfactant properties of this reagent permit a reduction in the amount of anti-corrosive and surfactant agents or their complete elimination, with obvious economic advantage. This result is unexpected since acylated aminoalcohols alone are less effective as either emulsion preventives or corrosion inhibitors than are the cyclic amidines; yet the effectiveness of the acylated aminoalcohols is enhanced when used in combination with the cyclic amidines. In other words, the presence of the cyclic amidines synergistically upgrades the effectiveness of the acylated aminoalcohols.

Although the agents of this invention have multiple functions, for the sake of brevity they will be referred to as emulsion-preventing agents, which is the prime purpose for their use. However, it should be understood that they also act as surfactants and anti-corrosive agents.

The compositions employed as agents comprise an admixture of a cyclic amidine and an acylated amino-alcohol in weight ratios of about 9–1 to 1–9 or higher, for example, about 1 to 1, but preferably about 3 to 2. The concentration of this admixture in the acidizing medium is about 0.01 to 5.0% or more by weight of acidizing medium, for example, from about 0.25 to 3.0%, but preferably about 0.5 to 2.5%.

In practicing my process, the emulsion-preventing agent is caused to act upon or come in contact with the fluids, liquids, or liquid mixture in a well that has been subjected to acidization, either while said fluids or liquids are at the bottom of the well, or while said fluids or liquids are traveling upwardly to the surface of the ground. But the particular procedure, the means used to effect the mixing or commingling of said emulsion-preventing agent with the well fluids or liquids, and the particular time when said mixing is effected are immaterial, so long as said emulsion-preventing agent becomes mixed with, dissolved in, or commingled with the cognate fluids of the well, or the liquids, or liquid mixture resulting from the acidization operation (the oil and the reaction product of the acid on the oil-bearing structure), prior to emergence from the well. Satisfactory results may be obtained by the following procedures, to wit:

(a) Introducing the emulsion-preventing agent, preferably in aqueous solution, prior to the introduction of the acid into the cognate fluids of a well;

(b) Introducing the emulsion-preventing agent along with the acid, i.e., dissolved in said acid; and (c) Introducing the emulsion-preventing agent, preferably in aqueous solution, immediately after the introduction of the acid.

The composition of matter that I have devised for acidizing the oil-bearing structure of oil wells, comprises the emulsion-preventing agent above described, mixed with, dissolved in, or combined with an acid, such as hydrochloric acid, nitric acid, sulfuric acid, sulfamic acid, acetic acid, or mixtures of the same. My preference is to use hydrochloric acid whose concentration is at least equal to approximately half strength commercial 18° Bé. acid, as I have found that when such an acid is mixed with approximately 0.01% to 5% or more of the herein contemplated emulsion-preventing agent or agents, one obtains a new composition of matter that is perfectly stable and homogeneous, and which exhibits unusual properties, particularly when said acid mixture or new composition of matter is employed in the acidization of oil-bearing strata. However, I wish it to be understood that my invention, i.e., the process and composition of matter herein described, is not restricted to the use of hydrochloric acid, but instead, contemplates the use of any suitable acid, several of which have previously been described as being usable in place of hydrochloric acid. Similarly, I wish it to be understood that the new composition of matter herein described may have other or additional uses, such, for example, as in the acidization of oil-bearing strata which do not produce emulsions. The hydrochloric acid or the like that is employed, may or may not have present other addition agent intended to make the acid particularly adapted to most localized conditions, which sometimes arise in the course of acidization.

A number of problems have been involved in the introduction of acid into oil-bearing strata. One problem is the prevention of corrosion, or damage to the metallic working parts of the well into which the acid is introduced. This has been overcome in various ways, such as by the use of an inhibitor. For the sake of brevity, reference is made to the following patents which give a cross-sectional view of the art related to acidization, although there are in addition certain other practical elements which are well known: U.S. Patent Nos. 1,877,504, dated Sept. 13, 1932, Grebe and Sanford; 1,891,667, Dec. 20, 1932, Carr; 1,911,446, May 20, 1933, Grebe and Sanford; 1,999,969, Feb. 12, 1935, Wilson; 2,011,579, Aug. 20, 1935, Heath and Fry; 2,024,718, Dec. 17, 1935, Chamberlain; 2,038,956, Apr. 28, 1935, Parkhurst; 2,053,285, Sept. 8, 1936, Grebe; 2,128,160, Aug. 23, 1938, Morgan; 2,161,085, June 6, 1939, Phalen.

As has been previously stated, in the acidization of oil-bearing strata or the like, it has been found necessary, in some instances, to add certain other materials or compounds which give additional desirable effects, at least under certain conditions. For instance, hydrofluoric acid or fluorides, have been added to intensify the action of the hydrochloric acid used to treat the well. Possibly this is related to the action on siliceous matter in the oil-bearing structure. The reason for the addition of inhibitors has been previously indicated. Sometimes it has been desirable to add tenacious foam-producing agents, such as glue, gelatin, or the like. In other instances reducing agents have been added to keep any dissolved iron salts in the ferrous state. Isopropyl alcohol or the like is sometimes added as a surface tension depressant. Thus, the addition of various other auxiliary agents, commonly referred to as addition agents, is well known.

The most concentrated hydrochloric acid, ordinarily available, is about 36% HCl strength. The commercial acid of this strength, or somewhat weaker, is usually diluted with an equal quantity of water before it is used for acidizaiotn, i.e., the acid used in acidization may vary from 14% to 16.5% HCl, although acid varying in strength from 5% to 20% HCl has been employed.

CYCLIC AMIDINES

The expression "cyclic amidines" is employed in its usual sense to indicate ring compounds in which ring there are present either 5 or 6 members, and having 2 nitrogen atoms separated by a single carbon atom supplemented by either two or three additional carbon atoms to complete the ring. All the carbon atoms and that nitrogen atom of the ring involving two monovalent linkages may be substituted. Needless to say, these compounds include members in which the substituents also may have one or more nitrogen atoms, either in the form of amino nitrogen atoms or in the form of acylated nitrogen atoms.

These cyclic amidines are further characterized as being substituted imidazolines and tetrahydropyrimidines in which the 2-position carbon of the ring is generally bonded to a hydrocarbon radical or comparable radical derived from an acid, such as a low molal fatty acid, a high molal fatty acid, or comparable acid, polycarboxy acid and the like.

For details of the preparation of imidazolines, substituted in the 2-position, from amines, see the following U.S. patents: U.S. No. 1,999,989, dated April 30, 1935, Max Bockmuhl et al.; U.S. No. 2,155,877, dated April 25, 1939, Edmund Waldmann et al.; and U.S. No. 2,155,878, dated April 25, 1939, Edmund Waldmann et al. Also see Chem. Rev. 32, 47 (43), and Chem Rev. 54, 593 (54).

Equally suitable for use in preparing compounds useful in my invention and for the preparation of tetrahydropyrimidines substituted in the 2-position are the polyamines containing at least one primary amino group and at least one secondary amino group, or another primary amino group separated from the first primary amino group by three carbon atoms instead of being separated by only 2 carbons as with imidazolines. This reaction, as in the case of the imidazolines, is generally carried out by heating the reactants to a temperature at which 2 moles of water are evolved per mole of carboxylic group and ring closure is effected. For details of the preparation of tetrahydropyrimidines, see German Patent No. 700,371 and U.S. Patent No. 2,194,419.

Substituted imidazolines and tetrahydropyrimidines are obtained from a variety of acids beginning with the one-carbon acid (formic) through and including higher fatty acids or the equivalent having as many as 32 or more carbon atoms, for example, from 8–22 carbons. Modified fatty acids also can be employed, as for example, phenylstearic acid or the like. Cyclic acids may be employed, including naphthenic acids. A variety of other acids including benzoic acid, substituted benzoic acid, alicyclic acids, and the like, have been employed to furnish the residue

from the acid RCOOH in which the C of the residue

is part of the ring. The fatty acids employed, for example, may be saturated or unsaturated. Branched long-chain fatty acids may be employed. See J. Am. Chem. Soc. 74, 2523 (1952). This applies also to the lower-molecular-weight acids as well.

Among sources of such acids may be mentioned straight-chain and branched-chain, saturated and unsaturated, aliphatic, cycloaliphatic, aromatic, hydroaromatic, aralkyl acids, etc.

Examples of saturated aliphatic monocarboxylic acids comprise: acetic, propionic, butyric, valeric, caproic, heptanoic, caprylic, nonanoic, capric, undecanoic, lauric, tridecanoic, myristic, pentadecanoic, palmitic, heptadecanoic, stearic, nonadecanoic, eicosanoic, heneicosanoic, docosanoic, tricosanoic, tetracosanoic, pentacosanoic, cerotic, heptacosanoic, montanic, nonacosanoic, melissic and the like.

Examples of ethylenic unsaturated aliphatic acids comprise: acrylic, methacrylic, crotonic, anglic, teglic, the pentenoic acids, the hexenoic acids, for example, hydrosorbic acid, the heptenoic acids, the octenoic, acids, the nonenoic acids, the decenoic acids, for example, obtusilic acid, the undecenoic acids, the dodencenoic acids, for example, lauroleic, linderic, etc., the tridecenoic acids, the tetradecenoic acids, for example, myristoleic acid, the pentadecenoic acids, the hexadecenoic acids, for example, palmitoleic acid, the heptadecenoic acids, the octodecenoic acids, for example, petrosilenic acid, oleic acid, elaidic acid, the nonadecenoic acids, for example, the eicosenoic acids, the docosenoic acids, for example, erucic acid, brassidic acid, cetoleic acid, the tetracosenic acids, and the like.

Examples of dienoic acids comprise the pentadienoic acids, the hexadienoic acids, for example, sorbic acid, the octadienoic acids, for example, linoleic, and the like.

Examples of the trienoic acids comprise the octadecatrienoic acids, for example, linolenic acid, eleostearic acid, pseudo-eleostearic acid, and the like.

Carboxylic acids containing functional groups such as hydroxy groups can be employed. Hydroxy acids, particularly the alpha-hydroxy acids, comprise glycolic acid, lactic acid, the hydroxyvaleric acids, the hydroxycaproic acids, the hydroxyheptanoic acids, the hydroxycaprylic acids, the hydroxynonanoic acids, the hydroxycapric acids, the hydroxydecanoic acids, the hydroxylauric acids, the hydroxytridecanoic acids, the hydroxymyristic acids, the hydroxypentadecanoic acids, the hydroxypalmitic acids, the hydroxyhexadecanoic acids, the hydroxyheptadecanoic acids, the hydroxy stearic acids, the hydroxyoctadecenoic acids, for example, ricinoleic acid, ricinelaidic acid, hyroxyoctadecynoic acids, for example, ricinstearolic acid, the hydroxyeicosanoic acids, for example, hydroxyarachidic acid, the hydroxydocosanoic acids, for example, hydroxybehenic acid, and the like.

Examples of acetylated hydroxyacids comprise ricinoleyllactic acid, acetylricinoleic acid, chloroacetylricinoleic acid, and the like.

Examples of the cyclic aliphatic carboxylic acids comprise those found in petroleum called naphthenic acids, hydnocarpic and chaulmoogric acids, cyclopentane carboxylic acids, cyclohexanecarboxylic acid, campholic acid, fencholic acids, and the like.

Examples of aromatic monocarboxylic acids comprise benzoic acid, substituted benzoic acids, for example, the toluic acids, the xyleneoic acids, alkoxybenzoic acid, phenylbenzoic acid, naphthalene carboxylic acid, and the like.

Mixed higher fatty acids derived from animal or vegetable sources, for example, lard, cocoanut oil, rapeseed oil, sesame oil, palm kernel oil, palm oil, olive oil, corn oil, cottonseed oil, sardine oil, tallow, soyabean oil, peanut oil, castor oil, seal oils, whale oil, shark oil, and other fish oils, teaseed oil, partially or completely hydrogenated animal and vegetable oils are advantageously employed. Fatty and similar acids include those derived from various waxes, such as beeswax, spermaceti, montan wax, Japan wax, coccerin and carnauba wax. Such acids include carnaubic acid, cerotic acid, lacceric acid, montanic acid, psyllastearic acid, etc. One may also employ higher molecular weight carboxylic acids derived by oxidation and other methods, such as from paraffin wax, petroleum and similar hydrocarbons; resinic and hydroaromatic acids, such as hexahydrobenzoic acid, hydrogenated naphthoic, hydrogenated carboxy diphenyl, naphthenic, and abietic acids; aralkyl and aromatic acids, such as Twitchell fatty acids, naphthoic acid, carboxydiphenyl pyridine carboxylic acid, blown oils, blown oil fatty acids and the like.

Other suitable acids include phenylstearic acid, benzoylnonylic acid, cetyloxybutyric acid, cetyloxyacetic acid, chlorstearic acid, etc.

Examples of the polycarboxylic acids comprise those of the aliphatic series, for example, oxalic, malonic, succinic, glutaric, adipic, pimelic, suberic, azelaic, sebacic, nonanedicarboxylic acid, decanedicarboxylic acids, undecanedicarboxylic acids, and the like.

Examples of unsaturated aliphatic polycarboxylic acids comprise fumaric, maleic, mesoconic, citraconic, glutonic, itaconic, muconic, aconitric acids, and the like.

Examples of aromatic polycarboxylic acids comprise phthalic, isophthalic acids, terephthalic acids, substituted derivatives thereof, (e.g. alkyl, chloro, alkoxy, etc. derivatives), biphenyldicarboxylic acid, diphenylether dicarboxylic acids, diphenylsulfone dicarboxylic acids and the like.

Higher aromatic polycarboxylic acids containing more than two carboxylic groups comprises hemimellitic, trimellitic, trimesic, mellophanic, prehnitic, pyromellitic acids, mellitic acids, and the like.

Other polycarboxylic acids comprise the dimeric, trimeric and poly acids, for example, the Emery Industries polymeric acids such as those described in U.S. Patent 2,763,612, and the like. Other polycarboxylic acids comprise those containing ether groups, for example, diglycolic acid. Mixtures of the above acids can be advantageously employed.

In addition, acid precursors such as esters, acid chlorides, glycerides, etc., can be employed in place of the free acid in calculating the stoichiometry of acylating the hydroxaliphatic cyclic amidines.

Thus, cyclic amidines within the scope of this invention comprise compounds of the formulae:

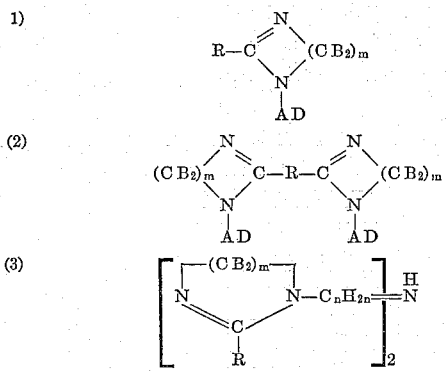

where

and $$=\overset{|}{C}-R-\overset{|}{C}=$$

are the residues dervide from the carboxylic acid, for example, any of those mentioned above, such as where R is a hydrocarbon radical having, for example, 1-30 carbons or more, a saturated or unsaturated aliphatic radical, a cycloaliphatic radical, an aryl radical, an aralkyl radical, an alkaryl radical, an alkoxyalkyl radical, an aryloxyalkyl radical and the like, $m$ is 2 or 3, B is hydrogen or a hydrocarbon radical, for example, a lower alkyl radical, i.e., $(CB_2)_{n'}$ can be a divalent radical having 2 or 3 carbons in its main chain, for example, a divalent radical of the formula $-CH_2-CH_2-$, $-CH_2-CH_2-CH_2-$, $$-\underset{\underset{CH_3}{|}}{CH}-CH_2-$$

$$-\underset{\underset{CH_3}{|}}{CH}-\underset{\underset{CH_3}{|}}{CH}-$$

$$-CH_2-\underset{\underset{CH_3}{|}}{CH}-CH_2-$$

etc.; and AD is hydrogen or the residue of the polyamine wherein A is, for example, $-C_nH_{2n}-NR-$;

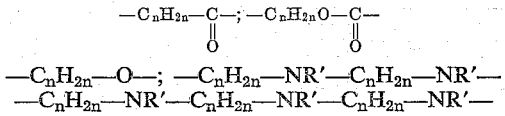

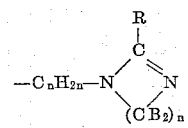

etc., and D and R' are hydrogen or a hydrocarbon radical, for example, aliphatic, cycloaliphatic, etc., and $n$ is a whole number, for example, 1-6, but preferably 2 or 3.

Any suitable cyclic-amidine-forming polyamine can be employed. Examples of suitable polyamines employed in preparing cyclic amidines comprise ethylene diamine, diethylene triamine, triethylene tetramine, tetraethylene pentamine, 1,2-diaminopropane, N-ethyl ethylene diamine, N,N-dibutyl diethylenediamine, 1,2-diaminobutane, hydroxyethyl ethylene diamine, etc. Cyclic-amidine-forming amines are well known and have been described, for example, in the above patents and publications.

The preferred class of cyclic amidines comprises imidazolines of the formula:

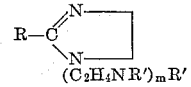

where R is a hydrocarbon group having 8-32 carbon atoms, R' is hydrogen or a hydrocarbon radical, but preferably hydrogen and $m$ is a small number, usually less than 6, but preferably 1-3.

Examples and the preparation of suitable imidazolines can be found in U.S. Reissue Patent 23,227 and suitable tetrahydropyrimidines in U.S. Patent 2,640,029. The cylic amidines of the present invention are prepared in a similar manner.

Actually, substituted imidazolines can be obtained from a variety fo polyamines but only in the instance where one starts with a triamine or higher amine is there a residual group having a primary amino radical as herein required. This does not mean, however, that one could not start with ethylene diamine or with 1,2-propylene diamine. The cyclic compounds so obtained could be reacted with a mole of ethylene imine or propylene imine so as to introduce the terminal primary amino group. From a practical standpoint, however, the most readily available polyamines are diethylene triamine, triethylene tetramine, and tetraethylene pentamine. No particular advantage has been found in using other polyamines in which some other divalent radical such as

appears.

For this reason, examples in Table I are limited to derivatives of the three most readily available polyamines above indicated.

Table I
MONOCYCLIC IMIDAZOLINES

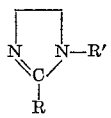

| Ex. No. | RCOOH source of RC | R' |
|---|---|---|
| 1a | Formic | $CH_2CH_2NH_2$ |
| 2a | Propionic | $CH_2CH_2NH_2$ |
| 3a | Isovaleric | $CH_2CH_2NH_2$ |
| 4a | Stearic | $CH_2CH_2NH_2$ |
| 5a | Melissic | $CH_2CH_2NH_2$ |
| 6a | Phenylstearic | $CH_2CH_2NH_2$ |
| 7a | Salicylic | $CH_2CH_2NH_2$ |
| 8a | Cresotinic | $CH_2CH_2NH_2$ |
| 9a | Naphthenic | $CH_2CH_2NH_2$ |
| 10a | Oleic | $CH_2CH_2NH_2$ |
| 11a | Acetic | $CH_2CH_2NHCH_2CH_2NH_2$ |
| 12a | Pelargonic | $CH_2CH_2NHCH_2CH_2NH_2$ |
| 13a | Lauric | $CH_2CH_2NHCH_2CH_2NH_2$ |
| 14a | Palmitic | $CH_2CH_2NHCH_2CH_2NH_2$ |
| 15a | Cerotic | $CH_2CH_2NHCH_2CH_2NH_2$ |
| 16a | p-tert-Butyl benzoic | $CH_2CH_2NHCH_2CH_2NH_2$ |
| 17a | p-Hydroxybenzoic | $CH_2CH_2NHCH_2CH_2NH_2$ |
| 18a | Salicylic | $CH_2CH_2NHCH_2CH_2NH_2$ |
| 19a | Hydroxy naphthenic | $CH_2CH_2NHCH_2CH_2NH_2$ |
| 20a | Benzoic | $CH_2CH_2NHCH_2CH_2NH_2$ |
| 21a | Formic | $CH_2CH_2NHCH_2CH_2NHCH_2CH_2NH_2$ |
| 22a | Methyloctadecanoic | $CH_2CH_2NHCH_2CH_2NHCH_2CH_2NH_2$ |
| 23a | Capric | $CH_2CH_2NHCH_2CH_2NHCH_2CH_2NH_2$ |
| 24a | Stearic | $CH_2CH_2NHCH_2CH_2NHCH_2CH_2NH_2$ |
| 25a | Phenylstearic | $CH_2CH_2NHCH_2CH_2NHCH_2CH_2NH_2$ |
| 26a | Cresotinic | $CH_2CH_2NHCH_2CH_2NHCH_2CH_2NH_2$ |
| 27a | Linoleic | $CH_2CH_2NHCH_2CH_2NHCH_2CH_2NH_2$ |
| 28a | Salicylic | $CH_2CH_2NHCH_2CH_2NHCH_2CH_2NH_2$ |
| 29a | 2-hydroxy-3-methoxybenzoic | $CH_2CH_2NHCH_2CH_2NHCH_2CH_2NH_2$ |
| 30a | Naphthenic | $CH_2CH_2NHCH_2CH_2NHCH_2CH_2NH_2$ |

The only polyamine available on a large scale for the manufacture of tetrahydropyrimidines is 3,3'-iminobispropylamine. This product can be converted into the tetramine or pentamine by appropriate reaction with a suitable imine or by reaction with acrylonitrile, followed by the usual steps of converting the intermediate into the amine. Tetrahydropyrimidines comparable to the substituted amidines in Table I, appear in Table II immediately following.

Table II
MONOCYCLIC TETRAHYDROPYRIMIDINES

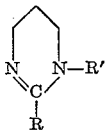

| Ex. No. | RCOOH source of RC | R' |
|---|---|---|
| 1b | Formic | $CH_2CH_2CH_2NH_2$ |
| 2b | Acetic | $CH_2CH_2CH_2NH_2$ |
| 3b | Butyric | $CH_2CH_2CH_2NH_2$ |
| 4b | Valeric | $CH_2CH_2CH_2NH_2$ |
| 5b | Isovaleric | $CH_2CH_2CH_2NH_2$ |
| 6b | Trimethyl acetic | $CH_2CH_2CH_2NH_2$ |
| 7b | Pelargonic | $CH_2CH_2CH_2NH_2$ |
| 8b | Lauric | $CH_2CH_2CH_2NH_2$ |
| 9b | Stearic | $CH_2CH_2CH_2NH_3$ |
| 10b | Arachidic | $CH_2CH_2CH_2NH_2$ |
| 11b | Eicosane-carboxylic | $CH_2CH_2CH_2NH_2$ |
| 12b | Cerotic | $CH_2CH_2CH_2NH_2$ |
| 13b | Melissic | $CH_2CH_2CH_2NH_2$ |
| 14b | Phenylstearic | $CH_2CH_2CH_2NH_2$ |
| 15b | Benzoic | $CH_2CH_2CH_2NH_2$ |
| 16b | Salicylic | $CH_2CH_2CH_2NH_2$ |
| 17b | Cresotinic | $CH_2CH_2CH_2NH_2$ |
| 18b | P-hydroxybenzoic | $CH_2CH_2CH_2NH_2$ |
| 19b | P-tert-butylbenzoic | $CH_2CH_2CH_2NH_2$ |
| 20b | 2-Hydroxy-3-methoxy benzoic | $CH_2CH_2CH_2NH_2$ |
| 21b | Oleic | $CH_2CH_2CH_2NH_2$ |
| 22b | Undecylenic | $CH_2CH_2CH_2NH_2$ |
| 23b | Linoleic | $CH_2CH_2CH_2NH_2$ |
| 24b | Hydroxybutyric | $CH_2CH_2CH_2NH_2$ |
| 25b | Methyloctadecanoic | $CH_2CH_2CH_2NH_2$ |

The procedure employed in the manufacture of substituted imidazolines from dicarboxy acids, is comparable to that employed when monocarboxy acids are used as reactants. As in the case of the monocarboxy acids, the acid may introduce a radical having less than 8 uninterrupted carbon atoms or 8 or more uninterrupted carbon atoms as preferred.

Suitable products derived from the three amines previously noted are described in Table III following:

Table III
BICYCLIC IMIDAZOLINES

| Ex. No. | HOOC-R-COOH source of -CRC- | R' |
|---|---|---|
| 1c | Dilinoleic | $CH_2CH_2NH_2$ |
| 2c | Adipic | $CH_2CH_2NH_2$ |
| 3c | Suberic | $CH_2CH_2NH_2$ |
| 4c | Sebacic | $CH_2CH_2NH_2$ |
| 5c | Nonodecane dicarboxylic | $CH_2CH_2NH_2$ |
| 6c | Diglycolic | $CH_2CH_2NH_2$ |
| 7c | Ethylene bis (glycolic) | $CH_2CH_2NH_2$ |
| 8c | Methylene disalicylic | $CH_2CH_2NH_2$ |
| 9c | Stearyl malonic | $CH_2CH_2NH_2$ |
| 10c | Phthalic | $CH_2CH_2NH_2$ |
| 11c | Succinic | $CH_2CH_2NHCH_2CH_2NH_2$ |
| 12c | Glutaric | $CH_2CH_2NHCH_2CH_2NH_2$ |
| 13c | Pimelic | $CH_2CH_2NHCH_2CH_2NH_2$ |
| 14c | Azelaic | $CH_2CH_2NHCH_2CH_2NH_2$ |
| 15c | Eicosane dicarboxylic | $CH_2CH_2NHCH_2CH_2NH_2$ |
| 16c | Dilinoleic | $CH_2CH_2NHCH_2CH_2NH_2$ |
| 17c | Isophthalic | $CH_2CH_2NHCH_2CH_2NH_2$ |
| 18c | Diglycolic | $CH_2CH_2NHCH_2CH_2NH_2$ |
| 19c | Lauryl malonic | $CH_2CH_2NHCH_2CH_2NH_2$ |
| 20c | Methylene disalicylic | $CH_2CH_2NHCH_2CH_2NH_2$ |
| 21c | Dilinoleic | $CH_2CH_2NHCH_2CH_2NHCH_2CH_2NH_2$ |
| 22c | Succinic | $CH_2CH_2NHCH_2CH_2NHCH_2CH_2NH_2$ |
| 23c | Suberic | $CH_2CH_2NHCH_2CH_2NHCH_2CH_2NH_2$ |
| 24c | Pimelic | $CH_2CH_2NHCH_2CH_2NHCH_2CH_2NH_2$ |
| 25c | Nonodecane dicarboxylic | $CH_2CH_2NHCH_2CH_2NHCH_2CH_2NH_2$ |
| 26c | Diglycolic | $CH_2CH_2NHCH_2CH_2NHCH_2CH_2NH_2$ |
| 27c | Methylene disalicylic | $CH_2CH_2NHCH_2CH_2NHCH_2CH_2NH_2$ |
| 28c | Stearyl malonic | $CH_2CH_2NHCH_2CH_2NHCH_2CH_2NH_2$ |
| 29c | Stearyl succinic | $CH_2CH_2NHCH_2CH_2NHCH_2CH_2NH_2$ |
| 20c | Terephthalic | $CH_2CH_2NHCH_2CG_2NHCH_2CH_2NH_2$ |

In the use of dicarboxy acids, the bulk of the examples were obtained from 3,3'-iminobispropylamine. These compounds are comparable to those which appeared in Table III preceding.

Table IV
BICYCLIC TETRAHYDROPYRIMIDINES

| Ex. No. | HOOC-R-COOH source of —CR— | R' |
|---|---|---|
| 1d | Maleic | $CH_2CH_2CH_2NH_2$ |
| 2d | Succinic | $CH_2CH_2CH_2NH_2$ |
| 3d | Glutaric | $CH_2CH_2CH_2NH_2$ |
| 4d | Adipic | $CH_2CH_2CH_2NH_2$ |
| 5d | Suberic | $CH_2CH_2CH_2NH_2$ |
| 6d | Sebacic | $CH_2CH_2CH_2NH_2$ |
| 7d | Pimelic | $CH_2CH_2CH_2NH_2$ |
| 8d | Azelaic | $CH_2CH_2CH_2NH_2$ |
| 9d | Nonodecane dicarboxylic | $CH_2CH_2CH_2NH_2$ |
| 10d | Eicosane dicarboxylic | $CH_2CH_2CH_2NH_2$ |
| 11d | Diglycolic | $CH_2CH_2CH_2NH_2$ |
| 12d | Ethylene bisglycolic | $CH_2CH_2CH_2NH_2$ |
| 13d | Methylene disalicylic | $CH_2CH_2CH_2NH_2$ |
| 14d | Dilinoleic | $CH_2CH_2CH_2NH_2$ |
| 15d | Stearyl malonic | $CH_2CH_2CH_2NH_2$ |
| 16d | Lauryl succinic | $CH_2CH_2CH_2NH_2$ |
| 17d | Isotetradecyl succinic | $CH_2CH_2CH_2NH_2$ |
| 18d | Phthalic | $CH_2CH_2CH_2NH_2$ |
| 19d | Isophthalic | $CH_2CH_2CH_2NH_2$ |
| 20d | Terephthalic | $CH_2CH_2CH_2NH_2$ |
| 21d | Glutaconic | $CH_2CH_2CH_2NH_2$ |

The above cyclic amidines containing acylated amino groups can also be employed, either instead of or in conjunction with the above compounds.

ACYLATED AMINOALCOHOLS

The acylated aminoalcohols which I employ in conjunction with the cyclic amidines in practicing my process are basic acylated aminoalcohols in which an acyloxy radical, derived from a detergent-forming acid having from 8 to 32 carbon atoms, is joined to a basic nitrogen atom by a carbon atom chain, or a carbon atom chain which is interrupted at least once by an oxygen atom.

The acylated derivatives of aminoalcohols of the formula

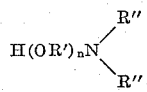

where $R''$ is a member of the class consisting of alkanol radicals, aminoalkanol radicals, and polyaminoalkanol radicals, in which polyaminoalkanol radicals the amino nitrogen atoms are united by divalent radicals selected from the class consisting of alkylene radicals, alkyleneoxyalkylene radicals, hydroxyalkylene radicals, and hydroxyalkyleneoxyalkylene radicals, and all remaining amino nitrogen valences are satisfied by hydroxyalkyl radicals, including those in which the carbon atom chain is interrupted at least once by an oxygen atom, and $R'$ is an alkylene radical having at least 2 and not more than 10 carbon atoms; and $n$ is a small whole number varying from 1 to 10. The aminoalcohols employed as ingredients of my reagents may have molecular weights ranging for example from 273 to about 4,000 or higher in monomeric form. The lower figure used above is derived by considering the amino-alcohol reactant to be triethanolamine and the acylating agent to be a $C_8$ unsaturated monocarboxy acid. To produce a compound of maximum molecular weight, the acylating agent could furnish three $C_{31}H_{63}CO$ radicals; the radical, $OR'$, could be 10 times $OC_{10}H_{20}$; and $R''$ could be a polyaminoalcohol radical, rather than the simple alkanol radical, $HOC_{10}H_{20}$. Such largest elements add up to produce a product of molecular weight 4,000, or higher. Thus, the basic acylated aminoalcohol employed as an ingredient of the reagent employed in the present process is an acylated aminoalcohol in which an acyloxy radical, derived from a detergent-forming acid, having from 8 to 32 carbon atoms, is joined to a basic nitrogen atom by a carbon atom chain, or a carbon atom chain which is interrupted at least once by an oxygen atom. The aminoalcohols may have more than one amino radical, or, for that matter, more than one basic amino radical. The compounds herein contemplated as ingredients of my reagents are well-know compounds and are produced by conventional procedures. Stated another way, the compounds herein contemplated are esters of aminoalcohols which may contain ether linkages, as well as more than one amino nitrogen atom.

The phrase "basic amino nitrogen atom" is used in its conventional sense. Unsaturated groups, or negative groups, if substituted for one or more of the hydrogens of ammonia, reduce the basicity of the nitrogen atom to a remarkable degree. In general, the presence of one negative group directly linked on the nitrogen is sufficient to destroy the ordinary basic properties. However, the effect of the negative group is diminished when it is not directly attached to the amino nitrogen.

Reference to an amine and the subsequent amino compounds is intended to include the salts and the anhydro base. In instances where water is present, the term includes the hydrated base, as well. Both the anhydro base and the hydrated base are obviously present when an aqueous system is being subjected to the reagent, or when the reagent is used as a water solution or dispersion. In an aqueous solution of the amine, the anhydro base, $R$—$NH_2$, the hydrated base, $R$—$NH_3$—$OH$, and the two ions are all present.

As has been previously stated, the reagents contemplated as ingredients in the compositions employed in the present process are well known products. For convenience, and for purpose of brevity, reference is made to the following three United States patents to De Groote and Keiser, to wit: Nos. 2,324,488, 2,324,489 and No. 2,324,490, all dated July 20, 1943. Said patents are concerned with processes for breaking water-in-oil emulsions. The demulsifying agent employed is in each instance the resultant derived by reaction between a certain fractional ester and an acylated amino-alcohol. The aminoalcohols described collectively in the aforementioned three patents are used as reactants for combining with a fractional acidic ester. Thus, said aminoalcohols must have present an alcoholiform hydroxyl as part of an acyl radical, or as part of a substituent for an amino hydrogen atom. In the instant case, such aminoalcohols are not employed as reactants, except as to salt formation reactions, and the hydroxyl group is not functional. Thus, one may employ, not only the aminoalcohols described in the three aforementioned United States patents, but also the obvious analogues, in which there is no hydroxyl radical present. Subsequently, reference will be made to this particular type and examples will be included.

Aforementioned U.S. Patent No. 2,324,488 describes hydroxylated acylated amino-ether compounds containing:

(a) A radical derived from a basic hydroxyaminoether and said radical being of the kind containing at least one amino nitrogen free from attached aryl and amido-linked acyl radicals; said hydroxyamino-ether radical being further characterized by the presence of at least one radical derived from a basic hydroxyamine and being attached by at least one ether linkage to at least one radical selected from the class consisting of glycerol radicals, polyglycol radicals, basic hydroxyamine radicals, amido hydroxyamine radicals, and aryl alkanolamine radicals; said basic hydroxy-amino-ether radical being characterized by containing not more than 60 carbon atoms; and (b) An acyl radical derived from a detergent-forming monocarboxy acid having at least 8 carbon atoms and not more than 32 carbon atoms, said acylated amino-ether being additionally characterized by the fact that said aforementioned acyl radical is a substituent for a hydrogen atom of an alcoholic hydroxyl radical.

Aforementioned U.S. Patent No. 2,324,489 describes hydroxylated acylated monoamino compounds free from ether linkages, said hydroxylated acylated amino compounds being of the following type:

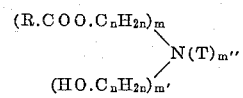

In which R.COO represents the oxy-acyl radical derived from a monobasic detergent-forming acid; T represents a member of the class consisting of hydrogen atoms, non-hydroxyl hydrocarbon radicals, and acylated radicals, obtained by replacing a hydrogen atom of the hydroxyl group of an alkylol radical by the acyl radical of a monobasic carboxy acid having less than 8 carbon atoms; $n$ represents a small whole number which is less than 10; $m$ represents the numeral 1, 2, or 3; $m'$ represents the numeral 0, 1, or 2; and $m''$ represents the numeral 0, 1, or 2; with the proviso that $m+m'+m''=3$.

Aforementioned U.S. Patent No. 2,324,490 describes basic hydroxylated acylated polyamino compounds free from ether linkages, said compounds being of the following formula:

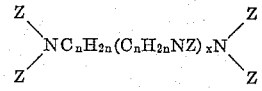

in which n represents a small whole number varying from 2 to 10; x is a small whole number varying from 0 to 10; Z is a member of the class consisting of H, RCO, R'CO, and D, in which RCO represents an acyl radical derived from a detergent-forming mono-carboxy acid; R'CO is an acyl radical derived from a lower-molecular weight carboxy acid having 6 carbon atoms or less; and D is a member of the class consisting of alkyl, hydroxyalkyl, aminoalkyl, and acyloxyalkylene, in which instance the acyl group is a member of the class consisting of RCO and R'CO; and the acylated polyamine is further characterized by the fact that there must be present a member of the class consisting of (a) Acyloxyalkylene radical in which the acyl group is RCO; and (b) Joint occurrence of an amino radical in which the acyl group is RCO and a hydroxyalkyl radical.

A description of certain high molal monocarboxy acids, and, more particularly, those commonly referred to as detergent-forming monocarboxy acids, appears in U.S. Patent No. 2,324,490. For convenience, the following description is substantially a verbatim form of the same subject-matter as it appears in said patent.

"It is well known that certain monocarboxy organic acids containing eight carbon atoms or more, and not more than 32 carbon atoms, are characterized by the fact that they combine with alkali to produce soap or soap-like materials. These detergent-forming acids include fatty acids, resin acids, petroleum acids, etc. For the sake of convenience, these acids will be indicated by the formula R.COOH. Certain derivatives of detergent-forming acids react with alkali to produce soap or soap-like materials, and are the obvious equivalent of the unchanged or unmodified detergent-forming acids. For instance, instead of fatty acids, one might employ the chlorinated fatty acids. Instead of the resin acids, one might employ the hydrogenated resin acids. Instead of naphthenic acids, one might employ brominated naphthenic acids, etc.

"The fatty acids are of the type commonly referred to as higher fatty acids; and of course, this is also true in regard to derivatives of the kind indicated, insofar that such derivatives are obtained from higher fatty acids. The petroleum acids include not only naturally-occurring naphthenic acids, but also acids obtained by the oxidation of wax, paraffin, etc. Such acids may have as many as 32 carbon atoms. For instance, see U.S. Patent No. 2,242,837, dated May 20, 1941, to Shields."

I have found that the acylated aminoalcohol ingredient of the composition of matter herein described, and employed in the present process, is preferably derived from unsaturated fatty acids having 18 carbon atoms. Such unsaturated fatty acids include oleic acid, ricinoleic acid, linoleic acid, linolenic acid, etc. One may employ mixed fatty acids, as, for example, the fatty acids obtained from hydrolysis of cottonseed oil, soyabean oil, etc. The preferred acylated aminoalcohol ingredient of my reagent is obtained from unsaturated fatty acids, and, more especially, unsaturated fatty acids containing a hydroxyl radical, or unsaturated fatty acids which have been subjected to oxidation. In addition to synthetic carboxy acids obtained by the oxidation of paraffins or the like, there is the somewhat analogous class obtained by treating carbon dioxide or carbon monoxide, in the presence of hydrogen or an olefin, with steam, or by causing a halogenated hydrocarbon to act with potassium cyanide and saponifying the product obtained. Such products or mixtures thereof, having at least 8 and not more than 32 carbon atoms and having at least one carboxyl group, or the equivalent thereof, are suitable as detergent-forming monocarboxy acids; and another analogous class, equally suitable, is the mixture of carboxylic acids obtained by the alkali treatment of alcohols of higher molecular weight formed in the catalytic hydrogenation of carbon monoxide. In fact, any of the acids described above for preparing cyclic amidines can be employed.

As is well known, one need not use the high molal carboxy acid, such as a fatty acid, for introduction of the acyl group or acyloxy group. Any suitable functional equivalent such as the acyl halide, the anhydride, ester, amide, etc., may be employed.

The reagent employed in the present process includes an aminoalcohol ester, as described; and particular attention is directed to the fact that, although such esterified aminoalcohol need not contain a hydroxyl radical, my preferred form is the hydroxylated type. Other aminoalcohol esters of the kind herein contemplated are described in U.S. Patent No. 2,259,704, dated October 21, 1941, to Monson and Anderson.

In light of what has been said, it hardly appears necessary to include a list of reactants and reagents derivable therefrom. However, for convenience, the following amines are included. Suitable primary and secondary amines, which may be employed to produce materials of the kind above described, include the following: Diethanolamine, monoethanolamine, ethylethanolamine, methylethanolamine, propanolamine, dipropanolamine, propylpropanolamine, etc. Other examples include cyclohexylolamine, dicyclohexylolamine, cyclohexylethanolamine, cyclohexylpropanolamine, benzylethanolamine, benzylpropanolamine, pentanolamine, hexanolamine, octylethanolamine, octadecylethanolamine, cyclohexanolethanolamine, etc.

Similarly, suitable tertiary amines which may be employed include the following: Triethanolamine, diethanolalkylamines such as diethanolethylamine, diethanolpropylamine, etc. Other examples include diethanolmethylamine, tripropanolamine, dipropanolmethylamine, cyclohexanoldiethanolamine, dicyclohexanolethanolamine, cyclohexyldiethanolamine, dicyclohexylethanolamine, dicyclohexanolethylamine, benzyldiethanolamine, benzyldipropanolamine, tripentanolamine, trihexanolamine, hexyldiethanolamine, octadecyldiethanolamine, etc.

Additional amines include ethanoldiethylamine, propanoldiethylamine, ethanoldipropylamine, propanoldipropylamine, dibenzylethanolamine, etc. Ether-type aminoalcohols may be obtained from the above-mentioned aminoalcohols, for example, by treating them with one or more moles of an oxyalkylating agent such as ethylene oxide, propylene oxide, butylene oxide, octylene oxide, styrene oxide, glycid, etc. It is to be noted that comparable products are obtained by treating primary or secondary amines other than acylamines with an olefin oxide. Aminoalcohols containing a primary or secondary amino group, i.e., having at least one or two amino hydrogen atoms present, may be employed under especially controlled conditions to give an ester, rather than an amide. One procedure is to permit amidification to take place, and then cause a rearrangement to the ester form. See U.S. Patent No. 2,151,788, dated March 28, 1939, to Jauersberger.

AMINOALCOHOL ESTER

*Example 1e*

One pound mole of ricinoleic acid is reacted with one pound mole of triethanolamine at approximately 180° to 240° C. for approximately 5 hours, until there is substantially complete esterification.

AMINOALCOHOL ESTER

*Example 2e*

Ricinoleic acid in the preceding example is replaced by methyl naphthenate.

AMINOALCOHOL ESTER

*Example 3e*

Methyl abietate is substituted for ricinoleic acid in Example 1e, preceding.

AMINOALCOHOL ESTER

Example 4e

Ethyl oleate is substituted for ricinoleic acid in Example 1e preceding.

AMINOALCOHOL ESTER

Example 5e

One pound mole of triethanolamine is reacted with one pound mole of ethylene oxide and the etherized amine so obtained is substituted for triethanolamine in Examples 1e to 4e preceding.

AMINOALCOHOL ESTER

Example 6e

One pound mole of triethanolamine is reacted with two pound moles of ethylene oxide and the etherized amine so obtained is substituted for triethanolamine in Examples 1e to 4e preceding.

AMINOALCOHOL ESTER

Example 7e

One pound mole of triethanolamine is reacted with three pound moles of ethyleneoxide and the etherized amine so obtained is substituted for triethanolamine in Examples 1e to 4e, preceding.

AMINOALCOHOL ESTER

Example 8e

One pound mole of triethanolamine is reacted with 4 to 6 pound moles of ethylene oxide and the etherized amine so obtained is substituted for triethanolamine in Examples 1e to 4e, preceding.

AMINOALCOHOL ESTER

Example 9e

One pound mole of ethanoldiamylamine obtained by reacting one pound mole of diamylamine with one pound mole of ethylene oxide is employed in place of triethanolamine in Examples 1e to 4e, preceding.

AMINOALCOHOL ESTER

Example 10e

The same procedure is employed as in the preceding example, except that an etherized amine is obtained by treating diamylamine with 2, 3 or 4 moles of ethylene oxide, and such etherized amine is employed instead of ethanol diamylamine.

AMINOALCOHOL ESTER

Example 11e

One pound mole of castor oil is reacted with 3 pound moles of triethanolamine, as described in the aforementioned U.S. Patent No. 2,324,489 to De Groote and Keiser, under the heading "Intermediate Hydroxylated Amine, Example 1."

AMINOALCOHOL ESTER

Example 12e

The same procedure is followed as in the preceding example, except that either one pound mole or two pound moles of glycerol are added to the reaction mass consisting of one pound mole of castor oil and three pound moles of triethanolamine.

AMINOALCOHOL ESTER

Example 13e

The resultants obtained in Examples 1e to 4e, preceding, are treated with equal molal ratios of an olefin oxide.

AMINOALCOHOL ESTER

Example 14e

One follows the directions of U.S. Patent No. 2,293,494, to De Groote and Keiser, dated August 18, 1942, to produce an amine of the following composition:

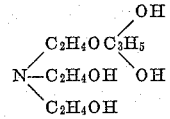

Such amine is substituted for triethanolamine in the preceding examples.

AMINOALCOHOL ESTER

Example 15e

One pound mole of hydroxyethyl ethylenediamine is reacted with 4 moles of ethylene oxide to give the corresponding tetrahydroxylated derivative. Such compound is employed in place of triethanolamine in the preceding examples.

AMINOALCOHOL ESTER

Example 16e

The same procedure is followed as in the preceding example, except that 5 to 8 moles of ethylene oxide are employed instead of 4 moles.

AMINOALCOHOL ESTER

Example 17e

The same procedure is employed as in the preceding example, except that diethylenetriamine is substituted for ethylenediamine.

AMINOALCOHOL ESTER

Example 18e

An amine of the following composition:

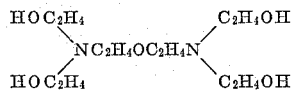

or

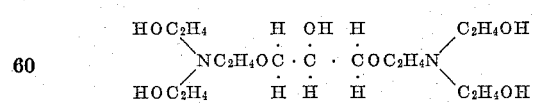

is substituted for ethylenediamine in the preceding examples.

AMINOALCOHOL ESTER

Example 19e

In the preceding examples, where more than one high molal acyl radical can be employed, two ricinoleyl radicals or the equivalent are introduced into the polyaminoalcohol.

AMINOALCOHOL ESTER

Example 20e

Unsymmetrical diphenyldiethylenetriamine is treated with ethylene oxide and substituted for oxyethylated ethylenediamine in the preceding examples.

AMINOALCOHOL ESTER

*Example 21e*

Symmetrical diacetyltriethylene tetramine is treated with 4 moles of ethylene oxide and substituted for oxyethylated ethylenediamine in the preceding examples.

AMINOALCOHOL ESTER

*Example 22e*

Additional examples are prepared in the manner previously described, except that one employs aminoalcohols obtained by the oxyalkylation of morpholine; 1,3-diamino-2-propanol; 2-amino-1-butanol; 2-amino-2-methyl-1-propanol; 2-amino-2-methyl-1,3-propanediol; 2-amino-2-ethyl-1,3-propanediol; tris (hydroxymethyl)-aminomethane; or piperidine. One may use enough of the olefin oxide, for instance, ethylene oxide, to convert all amino hydrogen atoms into hydroxyethyl radicals, or one may employ a greater amount so as to introduce ether linkages in addition.

AMINOALCOHOL ESTER

*Example 23e*

The same procedure is followed as in Example 22, preceding, except that one employs the amines described in Examples 9, 10, 11, and 13 of U.S. Patent No. 2,306,329, to DeGroote and Keiser, dated December 22, 1942.

AMINOALCOHOL ESTER

*Example 24e*

Soyabean oil, blown soyabean oil, blown castor oil, or blown teaseed oil is substituted for castor oil in the preceding examples.

In the above examples it is obvious that free hydroxyl radicals may be present as part of a hydroxyalkyl radical or as part of the acyl radical of a fatty acid such as ricinoleic acid.

Some of the acylated aminoalcohols contemplated as ingredients in my reagent are freely dispersible in water in the free state. Presumably such aqueous systems comprise the reagent in the form of a base, i.e., a substituted ammonium compound. In other instances, the free forms of the reagents are substantially water-insoluble, but the salt forms (e.g., the acetates) are very water-dispersible. It is to be understood that references to an acylated aminoalcohol, in these specifications and claims, include the reagent in the form of salts, as well as in the free form, and the hydrated form.

As an example of a preferred type of acylated aminoalcohol reagent which is effective as an ingredient in the composition used in my process, the following is submitted: I prepare a mixture of diamino and triamino materials which correspond essentially to either one of the two following type forms:

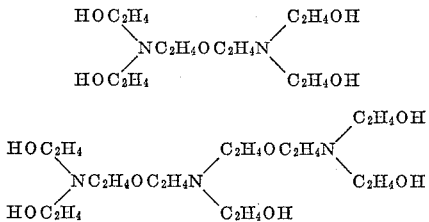

After determining the average molecular weight of such mixture, I combine the same with the ricinoleyl radical by heating it with castor oil in the proportion of 1 pound mole of castor oil for 3 pound moles of the mixed amines, "pound mole" in the latter case being calculated on the average molecular weight, as determined. Such mixture is heated to approximately 160–260° C. for approximately 6 to 25 hours, until reaction is complete, as indicated by the disappearance of all of the triricinolein present in the castor oil. Castor oil is used instead of some other source of ricinoleyl radical, e.g., ricinoleic acid, in the example because of its ready commercial availability and lower price.

All the chemical compounds previously described are water-soluble as such, or when dissolved in dilute acid, or acid of the concentration indicated. Such compounds may be combined not only with mineral acids, but also with organic acids, such as acetic acid, hydroxyacetic, lactic, stearic acid, or the like. For this reason, they can be used without difficulty in aqueous solution as an emulsion prevention agent by injecting such aqueous solution into the oil-bearing strata prior to acidization, or immediately after acidization. Such injection is made by conventional means, as, for example, the same apparatus or mechanical device employed for injecting acid into the well or oil-bearing strata.

The selected compounds may be dissolved in concentrated hydrochloric acid without dilution. The percentages employed have already been indicated. Such a concentrated hydrochloric acid may or may not contain some hydrofluoric acid. Likewise, if desired, the emulsion-preventing agents may be dissolved in water or other solvents such as hydrocarbons, alcohol, etc., and such solutions added to the hydrochloric acid or the like, in order to dilute the same to the desired concentration.

The following examples are presented to illustrate this invention:

REAGENT 1

*Both Cyclic Amidine and Acylated Aminoalcohol*

The preferred reagent is prepared by admixing (1) 13.2 parts by weight of a ricinoleic acid imidazoline (prepared by heating equimolar proportions of castor oil and tetraethylene pentamine at about 280° C. for 1.5 hours); (2) 10 parts of an acylated triethanolamine (prepared by reacting one mole of tall oil with 4.7 moles of triethanolamine, at about 255° C. for about 3.5 hours); and (3) 4.6 parts of hydroxacetic acid. This admixture is then diluted to 100 parts with water containing a small amount of isopropanol.

REAGENT 2

*Solely Cyclic Amidine*

This reagent contains 23.2 parts of the above ricinoleic imidazoline product and 4.6 parts of hydroxyacetic acid diluted to 100 parts with water containing a small amount of isopropanol. In other words, this reagent contains no acylated triethanolamine.

REAGENT 3

*Solely Acylated Aminoalcohol*

This reagent contains 23.2 parts of the above acylated triethanolamine-tall oil product and 4.6 parts of hydroxyacetic acid diluted to 100 parts with water containing a small amount of isopropanol. In other words, this reagent contains no imidazoline.

The demulsification effectiveness of these compositions are tested by the following procedure:

*Homogenizer test.*—50 ml. of 15% hydrochloric acid is placed in a beaker or graduate and the demulsifier added. The compound is then dispersed in the acid. 50 ml. of crude oil is then added and the mixture is homogenized. The volume of acid settled is noted versus time. The character of the acid layer is also observed.

The demulsification effect of the combined reagent (1) is compared with that of each of its active components, i.e., (2) the cyclic amidine, and (3) the acylated aminoethanol, according to above testing procedure. In other words, the combined effect of Reagents 2 and 3 employed together as Reagent 1 is compared with that of Reagent 2 and Reagent 3 employed individually. They were tested on two different oils taken from wells that are subjected to acidizing conditions. To each sample was added 0.5 ml. of the reagent indicated, having the indicated percent of active ingredients. The results are presented in the following table:

Table V

WELL 1

| Reagent | Percent active ingred. | Time from start of test | | | | | |
|---|---|---|---|---|---|---|---|
| | | 10 min. | | 1 hour | | 2 hours | |
| | | Acid layer, ml. | Appearance acid layer | Acid layer, ml. | Appearance acid layer | Acid layer, ml. | Appearance acid layer |
| (1) | 23 | 48 | Slightly hazy | 48 | Slightly hazy | 50 | Bright. |
| (2) | 26 | 42 | Hazy | 48 | Hazy | 49 | Fairly bright. |
| (3) | 20 | 2 | Slightly hazy | 13 | Slightly hazy | 27 | Bright. |

WELL 2

| (1) | 23 | 46 | Slightly hazy | 47 | Slightly hazy | 48 | Bright. |
|---|---|---|---|---|---|---|---|
| (2) | 26 | 40 | Hazy | 45 | Hazy | 47 | Hazy. |
| (3) | 20 | 1 | do | 10 | Slightly hazy | 35 | Bright. |

From the above table it is evident that Reagent 2 is a fast but incomplete acid demulsifier since the acid layer is often hazy, whereas Reagent 3 is slower, but more complete since it yields a brighter acid phase. Although I had expected that the admixture would have intermediate properties, I have found that the presence of the cyclic amidine upgrades the acylaminoalcohol in an unexpected manner.

The anti-corrosive effects of these reagents were also compared. The tests were carried out in the following manner:

Four pairs of accurately weighed 3¼" x ⅞" x 1/16" plates of SAE 1020 mild steel, which had been scrubbed thoroughly to remove all grease and rust, were immersed in 300 g. of respective HCl test solutions (15% HCl, by weight) for a period of ½ hour. The temperature of the HCl solution was maintained at 150° F.±1° throughout the tests. After the exposure period the plates are reweighed and the loss in weight determined. The results are presented in the following table:

Table VI

| Reagent | Active Material in HCl, percent | Average Weight Loss, grams |
|---|---|---|
| Reagent 1 | 0.023 | 0.025 |
| Reagent 2 | 0.10 | 0.029 |
| Reagent 3 | 0.10 | 0.035 |
| Blank | 0 | 0.121 |

From this table, it is evident that Reagent 2 is a relatively effective corrosion inhibitor where as Reagent 3 gave less protection. It would be expected that the weight losses found when a mixture of the two reagents was used would be greater than for Reagent 2 alone and smaller than for Reagent 3 alone. However, Reagent 1, even when used at about one-fourth the concentration of Reagents 2 and 3 in the above test, gave protection equal to Reagent 2. This shows the synergistic effect of mixing Reagents 2 and 3.

Similarly effective results were obtained where the Reagent 1 admixture was employed using a castor oil-imidazoline which has been treated with 4 moles of ethylene oxide per mole of castor oil-imidazoline instead of the unoxyalkylated product.

Synergistic admixtures are also obtained by employing the following compositions. The numbers in the following table refer to the example described above.

Table VII

| Reagent | Cyclic amidine | Aminoalcohol | Ratios, cyclic amidine to aminoalcohol |
|---|---|---|---|
| 4 | 4a | 1e | 1:1 |
| 5 | 6a | 1e | 1:1 |
| 6 | 9a | 2e | 3:2 |
| 7 | 13a | 3e | 4:2 |
| 8 | 18a | 4e | 1:1 |
| 9 | 24a | 5e (variation 4e) | 1:1 |
| 10 | 27a | 5e (variation 3e) | 2:3 |
| 11 | 28a | 14e (variation 1e) | 2:4 |
| 12 | 9b | 14e (variation 3e) | 1:1 |
| 13 | 14b | 1e | 1:1 |
| 14 | 15b | 3e | 3:2 |
| 15 | 21b | 14e (variation 3e) | 3:2 |
| 16 | 2c | 1e | 1:1 |
| 17 | 6c | 2e | 2:4 |
| 18 | 10c | 4e | 2:3 |
| 19 | 16c | 4e | 1:1 |
| 20 | 2d | 1e | 1:1 |
| 21 | 11d | 11e | 3:2 |

Having thus described my invention, what I claim as new and desire to obtain by Letters Patent is:

1. A composition of matter consisting essentially of an acid solution of an imidazoline derived from a detergent-forming acid and a polyethylene polyamine having up to 5 nitrogen atoms and an acylated aminoethanol derived from a detergent-forming acid in weight ratios of 9–1 to 1–9 of imidazoline to acylated aminoethanol.

2. A composition of matter consisting essentially of an acid solution of an imidazoline derived from castor oil and tetraethylenepentamine and an acylated aminoalcohol derived from tall oil and triethanolamine in weight ratios of 9–1 to 1–9 of imidazoline to acylated aminoalcohol.

3. A process of acidizing oil-bearing strata which comprises introducing into the cognate fluids of the oil well prior to emergence the composition of claim 1.

4. A process of acidizing oil-bearing strata which comprises introducing into the cognate fluids of the oil well prior to emergence the composition of claim 2.

References Cited in the file of this patent

UNITED STATES PATENTS

| 2,106,240 | De Groote et al. | Jan. 25, 1938 |
|---|---|---|
| 2,167,347 | De Groote et al. | July 25, 1939 |
| 2,233,383 | De Groote et al. | Feb. 25, 1941 |
| 2,292,208 | De Groote et al. | Aug. 4, 1942 |
| 2,468,163 | Blair et al. | Apr. 26, 1949 |
| 2,400,395 | De Groote et al. | May 14, 1957 |
| 2,792,390 | Stromberg | May 14, 1957 |
| 2,819,284 | Shen | Jan. 7, 1958 |